United States Patent [19]

Gersbach et al.

[11] Patent Number: 5,293,405
[45] Date of Patent: Mar. 8, 1994

[54] ADAPTIVE EQUALIZATION AND REGENERATION SYSTEM

[75] Inventors: John E. Gersbach, Burlington, Vt.; Charles R. Hoffman, Raleigh; Ilya I. Novof, Durhan, both of N.C.

[73] Assignee: International Business Machines Corp., Armonk, N.Y.

[21] Appl. No.: 785,488

[22] Filed: Oct. 31, 1991

[51] Int. Cl.⁵ .................. H03H 7/30; H03H 7/40; H03K 5/159
[52] U.S. Cl. .................. 375/14; 364/724.2; 333/18
[58] Field of Search ............... 375/11, 12, 14, 13, 375/120; 364/724.2; 333/18, 28 R

[56] References Cited

U.S. PATENT DOCUMENTS

| | | |
|---|---|---|
| 3,597,541 | 9/1971 | Proakis ................. 375/12 |
| 3,670,269 | 6/1972 | Starr et al. ............. 375/14 X |
| 4,530,104 | 7/1985 | Kamerman ............. 375/14 |
| 4,583,235 | 4/1986 | Domer et al. ........... 375/11 |
| 4,615,038 | 9/1986 | Lim, deceased et al. .. 375/14 |
| 4,672,631 | 6/1987 | Suzuki et al. ........... 375/14 |
| 4,673,979 | 6/1987 | Kobo et al. . |
| 4,759,035 | 7/1988 | McGary et al. ......... 375/12 |
| 4,789,994 | 12/1988 | Randall et al. ......... 375/12 |
| 4,799,180 | 1/1989 | Suzuki ................. 364/724.2 |
| 4,800,572 | 1/1989 | Nossek et al. ......... 375/14 |
| 4,800,573 | 1/1989 | Cupo ................... 375/14 |
| 4,943,789 | 7/1990 | Surie .................. 375/12 X |

Primary Examiner—Curtis Kuntz
Assistant Examiner—Bryan E. Webster
Attorney, Agent, or Firm—Calfee Halter & Griswold

[57] ABSTRACT

An adaptive equalization and regeneration system is provided for accurately reconstructing a received data pulse train which has been degraded with respect to amplitude and instantaneous frequency. The system comprises an equalizer which responds to a control signal to provide a variable gain function for the received signal and output an equalized signal, digital phase lock logic for receiving and extracting timing information from the equalized signal, a regenerator for matching the timing information with the equalized signal to reconstruct the received data in its originally transmitted form, and control circuitry for providing the control signal to the equalizer. The control signal adjusts the slope of the equalizer gain function so as to minimize amplitude and instantaneous frequency degradation at the equalizer output. The system includes a mechanism to detect and calculate total signal degradation at the equalizer output. Control logic is used to identify the slope of the equalizer gain function at which total signal degradation is minimized. The control signal, which corresponds to this identified slope, is applied to the equalizer in real time to maintain minimum total signal degradation at the equalizer output.

18 Claims, 5 Drawing Sheets

ADAPTIVE EQUALIZATION AND REGENERATION SYSTEM

TECHNICAL FIELD

The present invention relates generally to data regeneration circuitry, and more specifically to a data regeneration circuit having an equalizer into which a control signal is fed back to minimize instantaneous frequency and amplitude variances detected in the equalizer output.

BACKGROUND OF THE INVENTION

In digital data transmission systems, data in binary form is transmitted over media such as wires or fiber optic cables from a transmission line transmitter to a transmission line receiver. The binary data waveform is degraded with respect to its instantaneous frequency and its amplitude as it propagates along the transmission media due to electrical noise and dispersion. Electrical noise refers to the unwanted components of an electrical signal that tend to disturb accurate transmission and processing of the signal. Dispersion relates to pulse spreading of the signal and is measured in terms of time per distance traveled.

The transmission line receiver typically includes a regenerative repeater for reconstructing the transmitted data, regardless of electrical noise and transmission media degradations. The data pulse train is thereby permitted to travel through a dispersive and noisy medium, but instead of becoming more and more degraded until eventually the individual data bits are unrecognizable, the bits are repeatedly reconstructed and thus remain impervious to most of the degradation introduced by the transmission medium.

In the case of long distance, high capacity digital systems, the accuracy of the regenerative repeaters will often determine the overall effectiveness of the system. The function of the repeaters is to regenerate the transmitted pulse train in its original form, ideally without error. Such reconstruction can be achieved by sampling the pulse train at a regular frequency equal to the bit rate, and at each sample instant making a decision of the most probable symbol being transmitted. Typically, a threshold level is chosen to which the received signal is compared. Above this threshold level a binary one is registered, and below the threshold a binary zero is registered. The regenerator circuit makes these zero or one decisions at times corresponding to the center of the bit intervals based on the clock information provided by a timing circuit. The center of the bit intervals generally correspond to the mid-points of the threshold level crossings of the pulse train. By setting the decision times midway between the threshold level crossings, the odds of accurately reconstructing the transmitted bit are increased.

Repeaters in analog systems filter, equalize and amplify the received waveform, but are unable to reconstitute the originally transmitted waveform entirely free from degradation and noise. Signal degradation in long distance analog systems is therefore cumulative being a direct function of the number of repeater stages. In contrast, the signal degradation encountered in digital data transmission systems is purely a function of the quantization process and the system bit error rate. Hence, the possible regeneration of an exact replica of the originally transmitted waveform is a major advantage of digital transmission over corresponding analog systems.

Errors may still occur in the digital regeneration process, however, from various noises and disturbances associated with the regenerator. The noise sources can be either external of the system (for example, atmospheric noise or equipment generated noise) or internal to the system. Internal noise is present in every communications system and represents a basic limitation on the transmission and detection of signals. Hence, the amplitude of the received signal may be degraded to the point where the signal to noise ratio at the decision instant may be insufficient for an accurate decision to be made. For instance, with high noise levels, the binary zero may occur above the threshold and hence be registered as a binary one.

Moreover, the actual received data transmissions may be displaced in time from the true transmission. This time displacement, or intersymbol interference (ISI), of the transitions is caused by a new wave arriving at the receiver before the previous wave has reached its final value. Intersymbol interference (ISI) occurs due to pulse spreading caused by the dispersion of the transmission media. Variations in the clock rate and phase degradations (jitter) also distort the zero crossings resulting in decision time misalignment. When a pulse is transmitted in a given time slot, most of the pulse energy will arrive in the corresponding time slot at the receiver. However, because of this pulse spreading induced by the transmission medium, some of the pulse energy will progressively spread into adjacent time slots resulting in an interfering signal.

The effect of pulse spreading may be reduced by equalization which provides a frequency dependent gain to force the transmitted binary "one" to pass through "zero" at all neighboring decision times. The purpose of equalization, then, is to mitigate the effects of signal degradation and intersymbol interference. The equalizer thus optimizes the decision time so that the bit error rate of the system may be minimized.

Adaptive equalization involves adjusting the gain of a digital filter continuously during data transmission. Known adaptive equalization methods include switch-capacitor techniques and digital signal processing techniques. Both of these methods require data signal sampling at between eight and twelve times the transmitted data rate. Such a high sampling rate makes these methods difficult to apply to high speed applications. They also require large amounts of circuitry which translates into higher power consumption.

It is an object of the present invention, therefore, to provide a high-speed, low-power adaptive equalization and regeneration system for regenerating digitally transmitted data, wherein data is sampled at the transmitted data rate and both instantaneous frequency and amplitude variances are used as control parameters for the adaptive equalizer.

SUMMARY OF THE INVENTION

The present invention provides an adaptive equalization and regeneration system for receiving a transmitted digital signal which may be degraded with respect to its amplitude and instantaneous frequency, and for accurately regenerating the originally transmitted signal free of degradation. The system includes an equalizer providing a frequency dependent gain function for the received signal. A control signal is provided to the equalizer to adjust the slope of the gain function so as to minimize amplitude and instantaneous frequency degradation at the equalizer output. A regenerator is provided with this minimally degraded equalizer output, thereby enabling the regenerator to accurately reconstruct the received signal essentially in its originally transmitted form.

The system includes means to detect and calculate degradation in instantaneous frequency and amplitude at the equalizer output. A value of total signal degradation is obtained by summing the instantaneous frequency and amplitude degradations. Control logic is used to identify the slope of the equalizer gain function at which total signal degradation is minimized. The control signal, which corresponds to this identified slope, is applied to the equalizer in real time to maintain minimum total signal degradation at the equalizer output.

The adaptive equalization and regeneration system includes an equalization and regeneration circuit, a peak detect and averaging circuit, and a equalizer control circuit. The equalization and regeneration circuit comprises a variable gain amplifier, an equalizer, a regenerator and digital phase lock logic. The input to the variable gain amplifier is the received digital signal which is degraded with respect to its amplitude and instantaneous frequency due to dispersion introduced by the transmission medium and electrical noise. The variable gain amplifier amplifies this degraded signal and outputs the amplified signal to the equalizer. The equalizer provides a frequency dependent gain for the variable gain amplifier output and outputs an equalized signal to the regenerator and the digital phase lock logic. Accurate timing information is extracted from the equalized signal by the digital phase lock logic. The regenerator matches this accurate timing information with the equalized output of the equalizer to reconstruct the received data in its originally transmitted form.

The peak detect and averaging circuit comprises a peak detector and a peak averager. The peak detector determines the individual peaks of the pulses in the data pulse train which are output by the equalizer, and outputs the a voltage which is proportional to the peak amplitude to the peak averager. The peak averager calculates the average value of these determined peaks, and outputs the average value to the variable gain amplifier as a gain control signal which modifies the gain of the variable gain amplifier.

The peak detector also provides the equalizer control circuit with the instantaneous peak data required to calculate the change in amplitude between successive peaks in the data stream. The equalizer control circuit responds to these amplitude changes, as well as the instantaneous frequency changes, to provide a control signal to the equalizer. The equalizer control circuit comprises means to sense and store minimum and maximum values of the peak amplitudes detected, means to calculate variances in amplitude and instantaneous frequency in the equalized signal, and control logic to respond to these calculated variances and output the control signal to the equalizer. The control signal is in the form of a compensating voltage which is applied as an input to the equalizer to vary the slope of its gain function.

The control logic adds the calculated values for the variances in amplitude and instantaneous frequency in the equalized signal to arrive at a value of total signal variance. The control logic then searches for a particular slope of the equalizer gain function at which this total signal variance is minimized. By outputting a control signal which corresponds to this particular slope of the equalizer gain function, the equalizer is controlled using both instantaneous frequency and amplitude variances as control parameters to enable accurate regeneration of the received pulse train.

DETAILED DESCRIPTION OF THE PREFERRED EMBODIMENT

Figure 1:
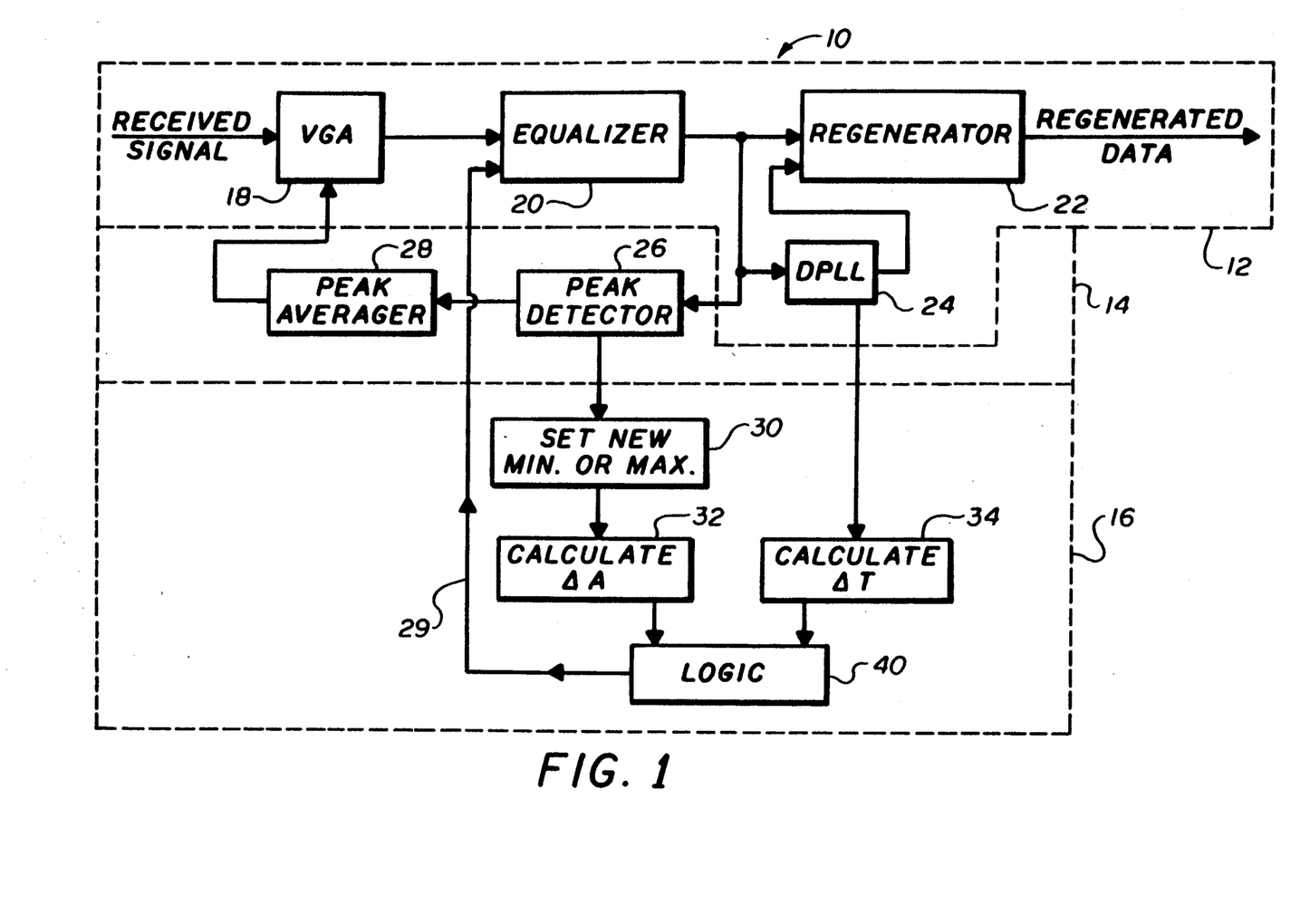
FIG. 1 is a schematic block diagram of an adaptive equalization and regeneration system constructed according to the principles of the present invention.

A block diagram of an adaptive equalization and regeneration system constructed according to the principles of the present invention is shown generally at 10 in FIG. 1. The system 10 is adapted to receive a transmitted digital signal which may be degraded with respect to its amplitude and instantaneous frequency, and to accurately regenerate the originally transmitted signal free of degradation. The system includes an equalization and regeneration circuit 12, a peak detect and averaging circuit 14, and a equalizer control circuit 16, descriptions of which will be provided later.

Figure 2A:
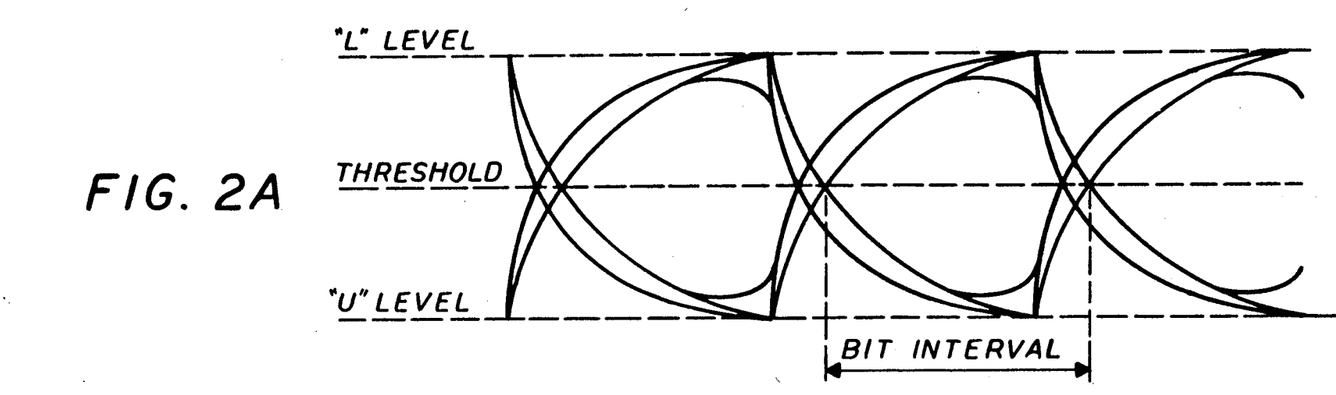
FIG. 2A is an illustration of superimposed data pulses received by the system of FIG. 1.
Figure 2B:
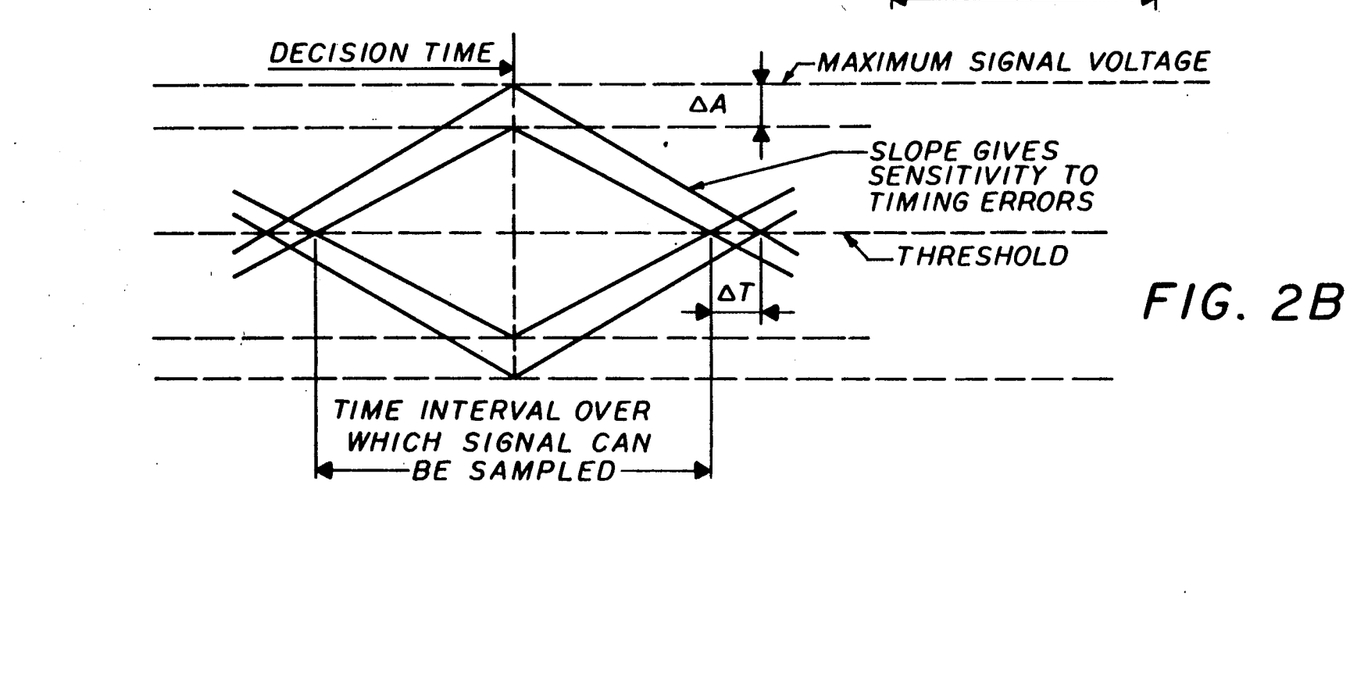
FIG. 2B is a simplified illustration of the diagram of FIG. 2A.

The degraded digital signals which are received by the system 10 are better shown in FIGS. 2A and 2B, frequently referred to as "eye diagrams", which represent the variances in amplitude and instantaneous frequency in the received signal. The eye diagram is a known method of assessing the data handling capability of a digital transmission system, and particularly the regenerative repeater, by examining the received waveform on an oscilloscope. The method may be used to evaluate the performance of both wire systems and optical fiber links.

As shown in FIG. 2A, the display obtained over a duration of two or more bit intervals, which results from superimposing all possible pulse sequences, has the shape of a human eye which is open. As shown in FIG. 2B, which is a simplified version of the eye diagram, the width of the eye opening defines the time interval over which the received signal can be sampled without error from intersymbol interference. The best time to sample the received waveform during this interval is when the height of the eye opening is largest, thereby providing the largest decision area. To regenerate the received pulse sequence without error, the eye must be open to indicate that a decision area exists, and the decision crosshair (provided by the decision time and the decision threshold lines) must be within this open area. The decision points must remain in the correct phase with respect to the received pulses, i.e., at or near the middle of the eye.

The effect of degradation of the pulses, caused by ISI and noise, is to reduce the size of, or possibly close, the eye. This degradation is shown as instantaneous frequency degradation ($\Delta T$) and as amplitude degradation ($\Delta A$) in FIG. 2B. $\Delta A$ reduces the height of the eye opening and is represented by the difference between the top of the eye opening and the maximum signal level voltage. Accordingly, for reliable transmission it is essential that the eye is kept open, the margin against an error occurring being the minimum distance between the decision crosshair and the edge of the eye. The greater the eye closure becomes, the more difficult it is to detect the signal. The rate at which the eye closes as the sampling time is varied (that is, the slope of the eye pattern sides) determines the sensitivity of the system to timing errors. The possibility of timing errors increases as the slope becomes more horizontal.

Referring back to FIG. 1, the equalization and regeneration circuit 12 amplifies the degraded signal which is received, equalizes the amplified and degraded signal by reshaping it, and regenerates the signal in its original form. Reshaping or equalizing the degraded signal involves providing a frequency dependent gain for the degraded signal. The peak detect and averaging circuit 14 controls the degree of amplification of the received signal by the equalization and regeneration circuit. The equalizer control circuit 16 detects and calculates the variances in amplitude and instantaneous frequency degradation of the received signal and uses these variances to control the equalization of the amplified signal.

The equalization and regeneration circuit 12 comprises a variable gain amplifier 18, an equalizer 20, a regenerator 22 and digital phase lock logic 24. The input to the variable gain amplifier 18 is the received digital signal which is degraded with respect to its amplitude and instantaneous frequency due to dispersion introduced by the transmission medium and electrical noise. The variable gain amplifier amplifies this degraded signal and outputs the amplified signal to the equalizer. The equalizer 20 provides a frequency dependent gain for the variable gain amplifier output and outputs an equalized signal to (i) the regenerator 22 and (ii) the digital phase lock logic 24. Accurate timing information is extracted from the equalized signal by the digital phase lock logic 24. This timing information is extracted by the DPLL 24 in a manner known in the art. The regenerator 22 matches this accurate timing information with the equalized output of the equalizer 20 to reconstruct the received data in its originally transmitted form. The reconstructed data output by the regenerator may then be further processed or sent along another transmission medium to another equalizing and regeneration system.

The peak detect and averaging circuit 14 comprises a peak detector 26 and a peak averager 28. The peak detector 26 determines the individual peaks of the pulses in the waveform which are output by the equalizer 20, and outputs a voltage which is proportional to the peak amplitude to the peak averager 28. The peak detector is reset after each bit interval, thereby enabling continuous peak amplitude detection. The peak detector outputs a voltage proportional to the peak value detected during the pulse cycle and provides this signal to the averager. The peak averager calculates the average value of these determined peaks, and outputs the average value to the variable gain amplifier 18 as a gain control signal. The average peak value is thus used to control the gain of the variable gain amplifier, thereby determining the extent of amplification of the degraded signal received by the equalization and regeneration circuit 12.

The peak detect and averaging circuit 14 comprising the peak detector 26 and the peak averager 28 form a closed loop feedback circuit for the equalization and regeneration circuit 12. By monitoring the output of the equalizer 20, the peak detect and averaging circuit may provide continuous feedback to the variable gain amplifier so that the average output of the equalizer is constant over time. The regenerator 22 is thereby provided with a pulse train having pulses of similar amplitude, thereby enabling precise operation of the regenerator within the bit intervals of the original pulse train. As explained above, the regenerator decides whether a pulse is a binary one or zero at times corresponding to the center of the bit intervals based on the timing information provided by the digital phase lock logic (DPLL) 24. By providing the regenerator with pulses of similar amplitude, the digital phase lock logic may more accurately determine the center of a particular bit interval.

The construction and operation of the equalizing and regeneration system described heretofore is known in the art of data transmission and will therefore not be explained in further detail, other than the equalizer 20, which will be explained in somewhat greater detail later.

The peak detector 26 also provides the equalizer control circuit 16 with the instantaneous peak data required to calculate the change in amplitude between successive peaks in the data stream. The control circuit 16 responds to this amplitude change, as well as the instantaneous frequency change, to provide a control signal 29 to the equalizer 20. The equalizer control circuit 16 comprises a min-max detector 30 for sensing and storing minimum and maximum values of the peak amplitudes detected in each bit interval, $\Delta A$ and $\Delta T$ calculators 32 and 34 for calculating degradation in signal amplitude and instantaneous frequency, respectively, in the equalizer output, and control logic 40 to respond to the calculated signal degradation and output the control signal 29 to the equalizer 20. The control logic 40 identifies the slope of the equalizer gain function at which total signal degradation is minimized. The control signal, which corresponds to this identified slope, is applied in the form of a voltage to the equalizer in real time to maintain minimum total signal degradation at the equalizer output.

The min-max detector 30 may be implemented in either hardware or software or a combination thereof. In the preferred embodiment, the min-max detector 30 samples each of the peaks detected by the peak detector 26 and stores the minimum value and maximum value of those peaks detected. If a peak is detected by the peak detector the value of which falls between the current minimum and maximum values, the current minimum and maximum values remain unchanged. If, however, a new minimum or maximum is sensed, that value replaces the old minimum or maximum. Thus, the min-max detector 30 at any given time contains the most recent maximum and minimum values detected by the peak detector 26.

The difference in detected minimum and maximum peak values is calculated by $\Delta A$ calculator 32, which merely subtracts the current minimum peak value from the current maximum peak value of amplitude. This calculated amplitude variance is shown in FIG. 2B and is referenced $\Delta A$.

The means by which changes in the instantaneous frequency of the received signal are detected is provided by ΔT calculator 34. This calculated instantaneous frequency variance is shown in FIG. 2B and is referenced ΔT. The DPLL 24 is provided with a bank of frequency counters which output counter values to be read by the ΔT calculator 34. The ΔT calculator 34 uses these counter values to determine the amount by which the received digital signal has been skewed during transmission.

Control logic 40 accepts both the ΔA and ΔT signals and responds thereto by outputting control signal 29 to the equalizer 20 to compensate for these variances. For example, as in the case shown in FIG. 2A, the amplitude of a received pulse increases as the pulse spreads due to transmission dispersion. The equalizer responds to the control signal 29 to alter its frequency dependent gain and output a signal which compensates for these amplitude and frequency variances. This equalized output signal is then fed back in closed loop fashion to the peak detector circuit which determines the peak amplitude of the output signal and the DPLL 24 which detects frequency variances.

Figure 3:
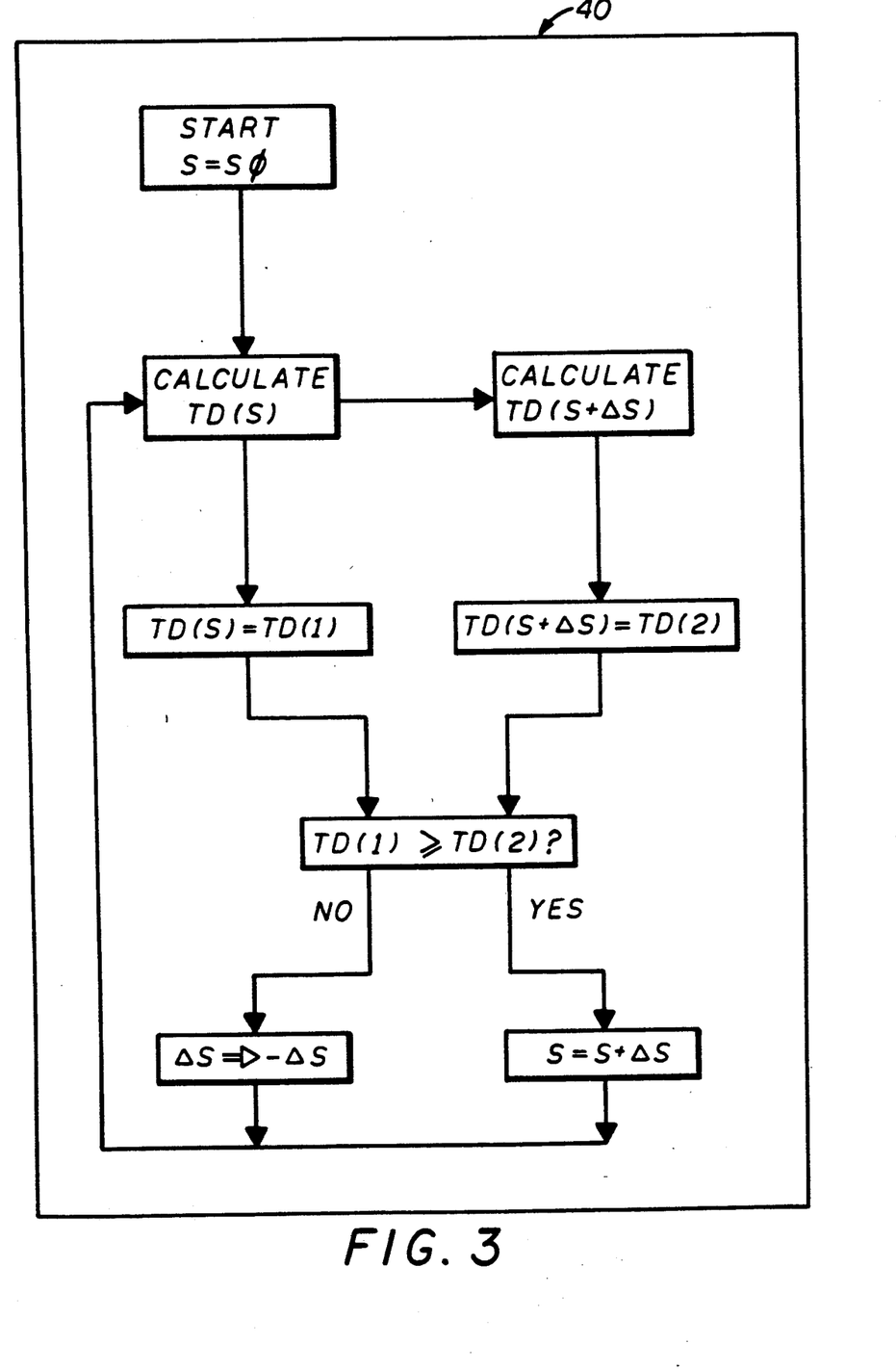
FIG. 3 is a flow chart of the control logic used in the system of FIG. 1.
Figure 4:
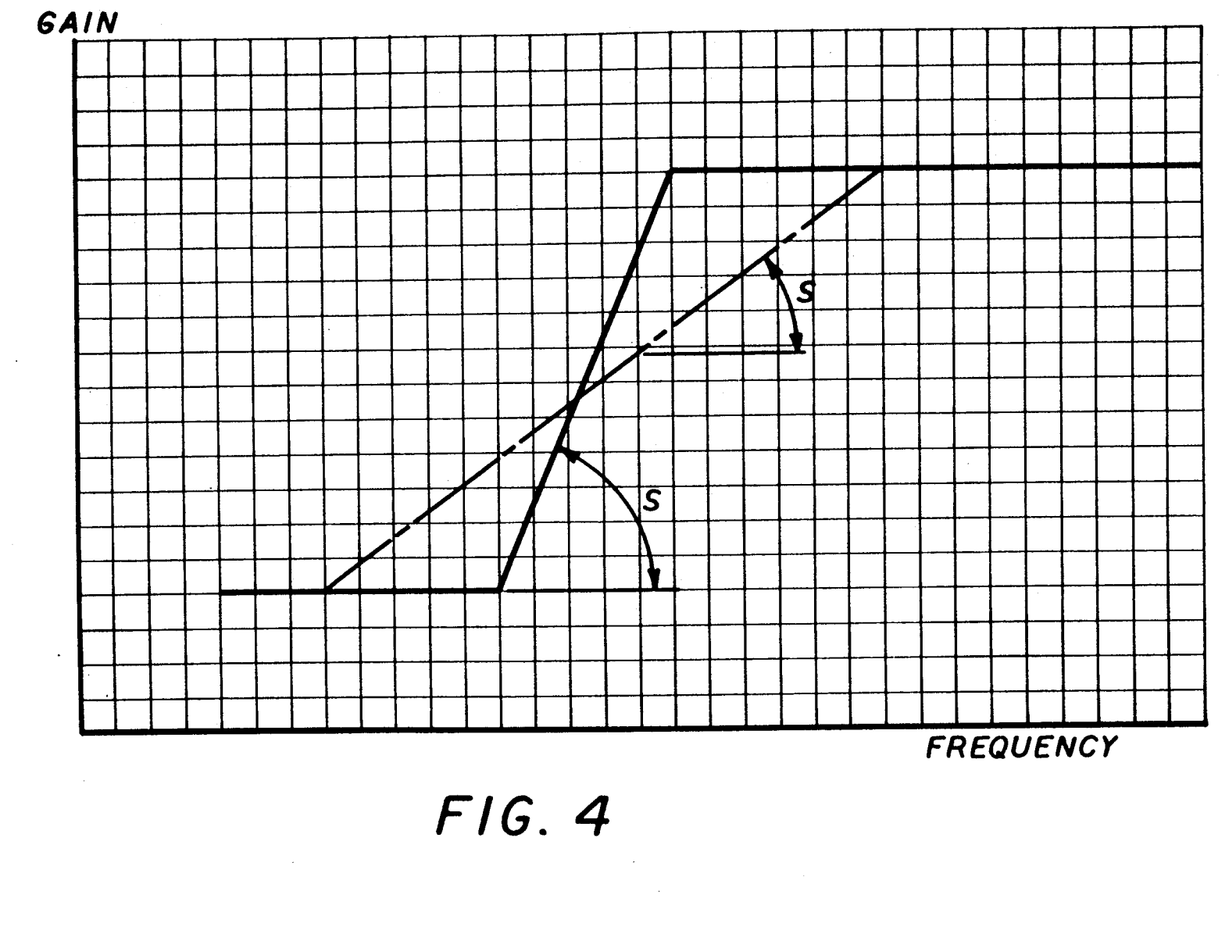
FIG. 4 is a graph of the gain function provided by the equalizer of FIG. 1.

The control logic 40 may also be implemented in either hardware or software. In the preferred embodiment, the control logic is implemented in software which is run on a computer having some type of memory storage. FIG. 3 illustrates a logic diagram which implements the function of the control logic 40. The control logic controls the slope of the gain function of the equalizer 20 to obtain the maximum eye opening, which corresponds to the least amount of total signal degradation of the equalizer output. A typical equalizer slope function is shown in FIG. 4 as a graphic representation of equalizer gain as a function of frequency. The value of the slope of this function is designated S.

Both the amplitude variance ΔA and the instantaneous frequency variance ΔT degrade the size of the eye opening. Total variation or degradation (TD) of the eye opening is defined as the sum of the normalized amplitude degradation (variation) and the normalized instantaneous frequency degradation (variation) of the received signal:

$$TD = (\Delta A/A) + (\Delta T/T),$$

where

A = the maximum amplitude of the received signal and

T = the bit interval period.

Figure 5:
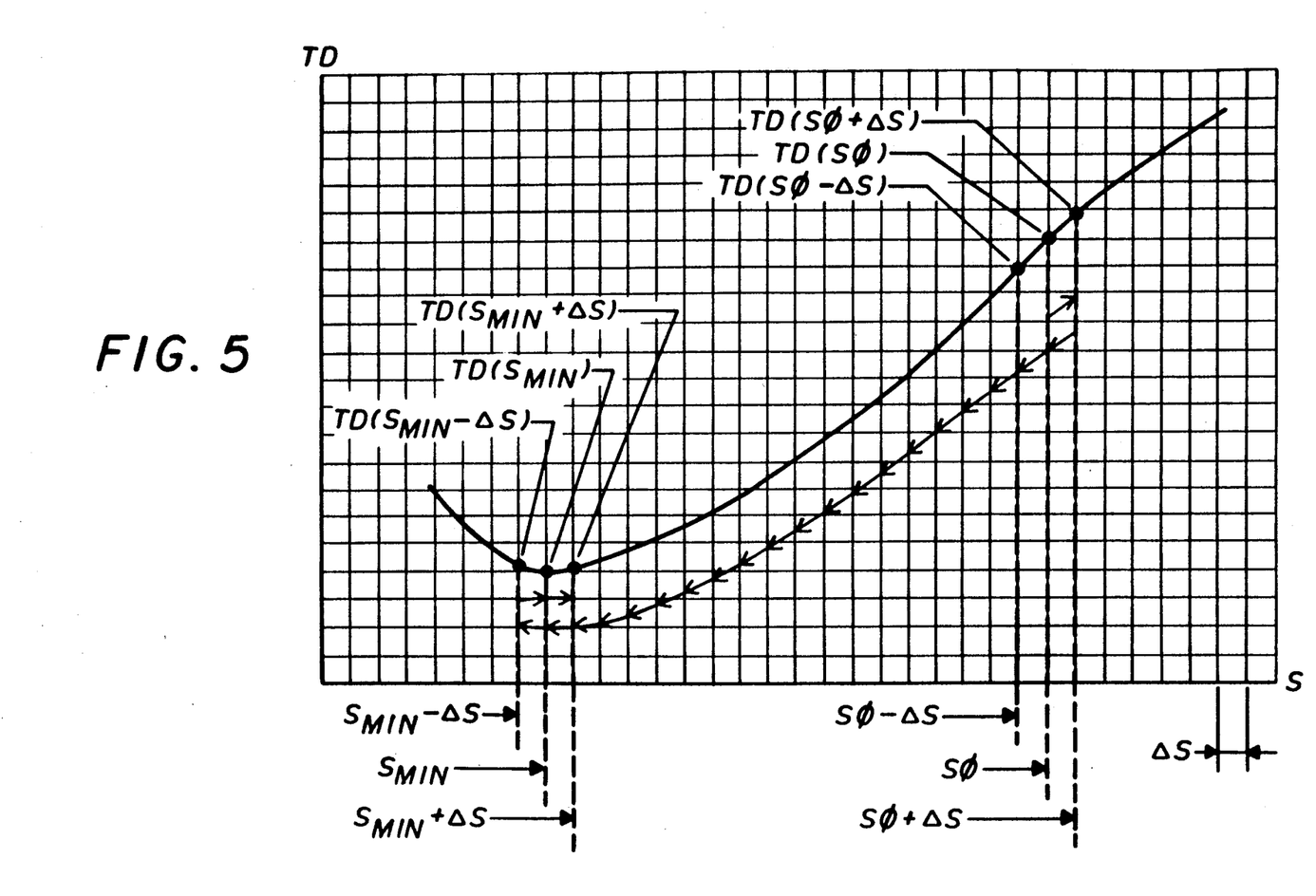
FIG. 5 is a graph of the total degradation of the amplitude and instantaneous frequency of the data signal received by the system of FIG. 1, as a function of the slope of the gain provided by the equalizer.

The control logic 40 as shown in the flow chart of FIG. 3 minimizes the TD function, so as to maximize the eye opening. The TD function is graphed as a function of the slope S of the equalizer gain function as shown in FIG. 5. The slope of the equalizer is changed accordingly in discrete steps ΔS. The value of ΔS is chosen large enough to avoid a local minimum in the TD function curve. The chosen value of ΔS depends on the transmission medium and the data rate, and is typically in the range of 0.003 dB/MHz to 0.010 dB/MHz.

Referring back to the control logic flow diagram of FIG. 3, initially a value of S0 is assigned to S. The initial value chosen depends on the transmission medium and the data transmission rate. Categories of cables are provided as an industry standard in ANSI Technical Systems Bulletin PN-2841, entitled "Additional Cable Specifications for Unshielded Twisted Pair Cables". For Category 5 cable and a data transmission rate of 16 Mbits/sec, S0 is selected at 0.3 dB/MHz. For Category 3 cable (DIW) and the same data transmission rate, S0 is selected at 0.4 dB/MHz.

The initial value of the total degradation TD at the point S0 on the S-axis of the TD function curve is then calculated as TD(S) (See FIG. 5). This initial value is stored as TD(1). A memory device in the computer on which the software is run such as a data register may be used to store the value of TD(S). S is incremented by ΔS and the next value of TD at the point S+ΔS on the S-axis of the TD function curve is then calculated as TD(S+ΔS). This next value is stored as TD(2). If TD(2) is greater than TD(1), a positive value of the slope of the TD function is indicated, which demonstrates that the total degradation TD of the received signal is increasing. Under this condition, the control logic reverses the polarity of ΔS, and the next value of TD is calculated at the point S−ΔS. If TD(1) is greater than TD(2), the polarity of ΔS is kept the same, as this condition indicates that the total degradation of the received signal is decreasing. This process continues until the calculated value of TD reaches a minimum and then again begins to increase. At this point the polarity of ΔS is reversed continually and the control logic fluctuates around this identified minimum. Accordingly, the minimum total degradation TD of the received signal is identified for a given value of S identified as $S_{min}$.

Identifying the path that the control logic takes as shown in FIG. 5, the initial value of TD at S0 is calculated. S is positively incremented by ΔS and the next value of TD at the point S+ΔS on the S-axis of the TD function curve is calculated. This next value is stored in TD(2). Because TD(2) is greater than TD(1), an increasing total degradation TD of the received signal is indicated. Under this condition, the control logic reverses the polarity of ΔS, and the next value of TD is calculate at the point S−ΔS. This next value of TD(S−ΔS) is less than TD(S). The process is continued incrementally for TD(S−2ΔS); TD(S−3ΔS), etc., until the calculated value of TD($S_{min}$−ΔS) again indicates an increasing total degradation of the received signal. This indicates that the value of TD($S_{min}$) is a minimum of the TD, or total degradation of the equalizer output.

Thus, for a given value of the slope S of the equalizer function, minimum total degradation of the received signal is identified. This identified minimum total degradation is represented by the control signal 29 output by the control logic 40 which is used as a control input to the equalizer 20. The equalizer 20 responds to this control signal by adjusting the slope of its equalizing gain function to that corresponding to minimum total degradation. By adjusting the equalizer gain to minimize total degradation, the eye opening is increased, and the bit error rate is correspondingly reduced.

Accordingly, the preferred embodiment of an adaptive equalization and regeneration system has been described. With the foregoing description in mind, however, it is understood that this description is made only by way of example, and that various changes may be implemented without departing from the true spirit of the invention as hereinafter claimed.

We claim:

1. An adaptive equalization and regeneration system for reconstructing a signal received in the form of a data pulse train which has been degraded with respect to amplitude and instantaneous frequency, comprising:

an equalizer for providing a variable gain function for said received signal and outputting an equalized signal, said equalizer gain function being varied in response to a voltage level applied to said equalizer to vary said equalizer gain function and increasing directly as a function of the frequency of said received signal, said voltage level varying the slope of said gain function, said gain function having a slope determined by a change in gain with respect to a change in said frequency;

digital phase lock logic for receiving said equalized signal and outputting timing information obtained from said equalized signal;

a regenerator for receiving said equalized signal and said timing information and matching said timing information with said equalized signal to reconstruct the received data essentially in its originally transmitted form; and control circuitry connected to said equalizer for detecting variances in amplitude and instantaneous frequency in said equalized signal and for outputting said voltage level signal to said equalizer to vary said equalizer gain function in response to said detected variances, said control circuitry including control logic for (i) adding said variances in amplitude and instantaneous frequency in said equalized signal to provide a total signal variance, and (ii) determining the slope of said equalizer gain function at which said total signal variance is a minimum.

2. An adaptive equalization and regeneration system for reconstructing a signal received in the form of a data pulse train which has been degraded with respect to amplitude and instantaneous frequency, comprising:

an equalizer for providing a variable gain function for said received signal and outputting an equalized signal, said equalizer gain function being varied in response to a control signal and increasing directly as a function of the frequency of said received signal, said gain function having a slope determined by a change in gain with respect to a change in said frequency;

digital phase lock logic for receiving said equalized signal and outputting timing information obtained from said equalized signal;

a regenerator for receiving said equalized signal and said timing information and matching said timing information with said equalized signal to reconstruct the received data essentially in its originally transmitted form;

control circuitry connected to said equalizer for detecting variances in amplitude and instantaneous frequency in said equalized signal and for outputting said control signal to said equalizer to vary the slope of said equalizer gain function, said control circuitry including control logic for (i) adding said variances in amplitude and instantaneous frequency in said equalized signal to provide a total signal variance, and (ii) determining the slope of said equalizer gain function at which said total signal variance is a minimum;

an automatic gain control circuit which is connected to said equalizer and which automatically controls an amplifying gain of said received signal to output an amplified signal to said equalizer; and a peak detecting and averaging circuit comprising (i) a peak detector connected to said equalizer for sensing peak values of individual pulses in the data pulse train and for outputting said peak values, and (ii) a peak averager connected to said peak detector for receiving and averaging said peak values and for outputting an average value of said peak values to said automatic gain control circuit.

3. The system of claim 2, wherein said control circuitry includes (i) circuitry to calculate said variances in instantaneous frequency in response to said timing information output by said digital phase lock logic, and (ii) circuitry to calculate said variances in amplitude in response to said peak values sensed by said peak detector.

4. The system of claim 3, wherein said control logic determines the slope of said equalizer gain function at which said total signal variance is minimized and calculates said total signal variance for a plurality of values of said slope of said equalizer gain function.

5. The system of claim 4, wherein said control logic calculates said total signal variance incrementally in steps for said plurality of values of said slope.

6. The system of claim 5, wherein said incremental steps are dependent on data rate and data transmission medium, and are between the range of 0.003 dB/MHz to 0.010 dB/MHz.

7. An adaptive equalization and regeneration system for reconstructing a signal received in the form of a data pulse train which has been degraded with respect to amplitude and instantaneous frequency, comprising:

an equalizer for providing a variable gain function for said received signal and outputting an equalized signal, said equalizer gain function being varied in response to a control signal and increasing directly as a function of the frequency of said received signal, said control signal varying the slope of said gain function, said gain function having a slope determined by a change in gain with respect to a change in said frequency;

digital phase lock logic for receiving said equalized signal and outputting timing information obtained from said equalized signal;

a regenerator for receiving said equalized signal and said timing information and matching said timing information with said equalized signal to reconstruct the received data essentially in its originally transmitted form;

control circuitry connected to said equalizer for detecting variances in amplitude and instantaneous frequency in said equalized signal and for outputting said control signal to said equalizer to vary said equalizer gain function in response to said detected variances, said control circuitry including control logic for (i) adding said variances in amplitude and instantaneous frequency in said equalized signal to provide a total signal variance, and (ii) determining the slope of said equalizer gain function at which said total signal variance is a minimum; and an automatic gain control circuit which is connected to said equalizer and which automatically controls an amplifying gain of said received signal to output an amplified signal to said equalizer.

8. A method of reconstructing a signal received in the form of a data pulse train which has been degraded with respect to amplitude and instantaneous frequency, comprising the steps of:

providing a variable equalizing gain for said received signal and outputting an equalized signal, said equalizing gain being varied in response to a control signal and increasing directly as a function of the frequency of said received signal, said equalizing gain defined by a function having a slope determined by a change in gain with respect to a change in said frequency;

controlling an amplifying gain for said received signal to output an amplified signal, prior to providing a variable equalizing gain for said received signal, by sensing peak values of individual pulses in said equalized signal and averaging said peak values;

providing said control signal using circuitry for detecting variances in amplitude and instantaneous frequency in said equalized signal, adding said variances in amplitude and instantaneous frequency to provide a total signal variance, determining said slope of said gain function at which said total signal variance is a minimum, and outputting said control signal to alter the slope of said equalizing gain function in response to said variances;

extracting timing information from said equalized signal and outputting said timing information to a regenerator for receiving said equalized signal and said timing information; and matching said timing information with said equalized signal to reconstruct the received data essentially in its originally transmitted form.

9. The method of claim 8, wherein said step of providing said control signal includes the steps of calculating said variances in amplitude in response to said sensed peak values, and calculating said variances in instantaneous frequency in response to said extracted timing information.

10. The method of claim 9, wherein said step of providing said control signal includes providing control logic for determining the slope of said equalizing gain function at which said total signal variance is minimized, and for calculating said total signal variance for a plurality of values of said slope of said equalizing gain function.

11. The method of claim 10, wherein said control logic calculates said total signal variance incrementally in steps for said plurality of values of said slope.

12. The method of claim 11, wherein said incremental steps are determined by the rate at which and the transmission medium over which said data pulse train is transmitted and are between the range of 0.003 dB/MHz to 0.010 dB/MHz.

13. The method of claim 10, wherein said step of determining the slope of said equalizing gain function at which minimum total signal variance occurs includes the steps of:

selecting a first value of slope of said equalizing gain function and calculating said total signal variance at said first selected value;

selecting a second value of slope of said equalizing gain function and calculating said total signal variance at said second selected value;

storing and comparing said total signal variances calculated at said first and second slope values;

selecting additional values of slope of said equalizing gain function in response to said comparison, and calculating said total signal variances at said selected additional values until a minimum total signal variance is identified.

14. A method of reconstructing a signal received in the form of a data pulse train which has been degraded with respect to amplitude and instantaneous frequency, comprising the steps of:

providing a variable equalizing gain for said received signal and outputting an equalized signal, said equalizing gain being varied in response to a control signal and increasing directly as a function of the frequency of said received signal, said equalizing gain defined by a function having a slope determined by a change in gain with respect to a change in said frequency;

providing said control signal using circuitry for (i) sensing peak amplitudes in the equalized signal, (ii) detecting variances in said peak amplitudes and variances in instantaneous frequency in said equalized signal, and (iii) outputting said control signal to alter said equalizing gain function in response to said detected variances in peak amplitudes and instantaneous frequency;

extracting timing information from said equalized signal and outputting said timing information to a regenerator for receiving said equalized signal and said timing information; and matching said timing information with said equalized signal to reconstruct the received data essentially in its originally transmitted form.

15. The method of claim 14, wherein said control signal alters the slope of said equalizer gain function, and wherein said step of providing said control circuitry includes the steps of (i) adding said variances in amplitude and instantaneous frequency in said equalized signal to provide a total signal variance, and (ii) determining said slope of said gain function at which said total signal variance is a minimum.

16. An adaptive equalization and regeneration system for reconstructing a signal received in the form of a data pulse train which has been degraded with respect to amplitude and instantaneous frequency, comprising:

an equalizer for providing a variable gain function for said received signal and outputting an equalized signal, said equalizer gain function being varied in response to a control signal and increasing directly as a function of the frequency of said received signal, said gain function having a slope determined by a change in gain with respect to a change in said frequency;

digital phase lock logic for receiving said equalized signal and outputting timing information obtained from said equalized signal;

a regenerator for receiving said equalized signal and said timing information and matching said timing information with said equalized signal to reconstruct the received data essentially in its originally transmitted form; and control circuitry connected to said equalizer for (i) sensing peak amplitudes in the equalized signal, (ii) detecting variances in said peak amplitudes and variances in instantaneous frequency in said equalized signal, and (iii) outputting said control signal to said equalizer to vary said equalizer gain function in response to said detected variances in peak amplitudes and instantaneous frequency.

17. The system of claim 16, wherein said control signal varies the slope of said equalizer gain function, and wherein said control circuitry includes control logic for (i) adding said variances in amplitude and instantaneous frequency in said equalized signal to provide a total signal variance, and (ii) determining the slope of said equalizer gain function at which said total signal variance is a minimum.

18. A method of reconstructing a signal received in the form of a data pulse train which has been degraded with respect to amplitude and instantaneous frequency, comprising the steps of:

automatically controlling an amplifying gain for said received signal to output an amplified signal, providing a variable equalizing gain for said amplified signal and outputting an equalized signal, said equalizing gain being varied in response to a control signal and increasing directly as a function of the frequency of said amplified signal, said control signal altering the slope of said equalizer gain function, said equalizing gain defined by a function having a slope determined by a change in gain with respect to a change in said frequency;

providing said control signal using circuitry for (i) detecting variances in amplitude and instantaneous frequency in said equalized signal, (ii) adding said variances in amplitude and instantaneous frequency in said equalized signal to provide a total signal variance, (iii) determining said slope of said gain function at which said total signal variance is a minimum, and (iv) outputting said control signal to alter said equalizing gain function in response to said determined slope;

extracting timing information from said equalized signal and outputting said timing information to a regenerator for receiving said equalized signal and said timing information; and matching said timing information with said equalized signal to reconstruct the received data essentially in its originally transmitted form.

* * * * *